United States Patent
Krig

(10) Patent No.: US 8,904,196 B2
(45) Date of Patent: Dec. 2, 2014

(54) POWER MANAGEMENT METHOD AND APPARATUS

(75) Inventor: Scott A. Krig, Santa Clara, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 674 days.

(21) Appl. No.: 12/779,620

(22) Filed: May 13, 2010

(65) Prior Publication Data

US 2011/0283117 A1    Nov. 17, 2011

(51) Int. Cl.
*G06F 1/26* (2006.01)
*G06F 1/32* (2006.01)
*G06F 1/20* (2006.01)

(52) U.S. Cl.
CPC .......... *G06F 1/3203* (2013.01); *G06F 1/3296* (2013.01); *Y02B 60/1275* (2013.01); *G06F 1/206* (2013.01); *Y02B 60/1285* (2013.01); *Y02B 60/1217* (2013.01); *G06F 1/324* (2013.01)
USPC ........... 713/300; 713/320; 713/322; 713/323; 714/47.1; 700/293; 700/295; 700/297

(58) Field of Classification Search
CPC ..... G06F 1/266; G06F 1/3203; G06F 1/3215; G06F 1/3296
USPC ................. 713/300, 320, 322, 323; 714/47.1; 700/293, 295, 297
See application file for complete search history.

(56) References Cited

U.S. PATENT DOCUMENTS

| | | | | |
|---|---|---|---|---|
| 7,661,003 | B2 * | 2/2010 | Naffziger et al. | 713/320 |
| 2005/0268123 | A1 * | 12/2005 | Arakawa | 713/300 |
| 2007/0028123 | A1 * | 2/2007 | Lindley et al. | 713/300 |
| 2007/0233881 | A1 * | 10/2007 | Nochta et al. | 709/228 |
| 2009/0006901 | A1 * | 1/2009 | Brey et al. | 714/47 |

* cited by examiner

*Primary Examiner* — Michael J Brown
(74) *Attorney, Agent, or Firm* — Faegre Baker Daniels LLP

(57) ABSTRACT

An apparatus includes a power management interpretation circuit and a power management control circuit. The power management interpretation circuit provides power management control information in response to power control parameters. The power management control circuit selectively controls power consumption of a power consuming circuit based on the power management control information. The power consuming circuit provides the power control parameters.

23 Claims, 4 Drawing Sheets

POWER MANAGEMENT METHOD AND APPARATUS

FIELD

The present disclosure generally relates to power management, and more particularly, to power management of various power consuming circuits associated with an apparatus.

BACKGROUND

Many modern devices rely on batteries to provide power necessary to operate the device. Consumers using such devices generally desire to use the devices for longer time periods in between recharging the batteries. As such, there is a continual effort to perform operations of the device in more energy efficient ways, even as the applications performed by the devices become more sophisticated, and in some cases, require more power.

Modern devices typically include multiple power consuming circuits such as a central processing unit (CPU), a bridge circuit (e.g., Northbridge and/or Southbridge), memory, a graphics processing unit (GPU), a display, a network interface circuit, and/or a fan for example. Due to the various operating parameters associated with the multiple power consuming circuits, it can be difficult to design a power management system. For example, each power consuming circuit would likely have a white paper describing its capabilities and parameters that can be adjusted in order to reduce power consumption. As such, a designer (e.g., engineer) would have to interpret each of the white papers and design a power management scheme based thereon. This process can be very tedious and time consuming.

Accordingly, there is a need to solve the problems of the prior art in order to provide a method and apparatus that simplifies the design power management systems having multiple power consuming circuits.

BRIEF DESCRIPTION OF THE DRAWINGS

The invention will be more readily understood in view of the following description when accompanied by the below figures, wherein like reference numerals represent like elements.

DETAILED DESCRIPTION

Figure 1:
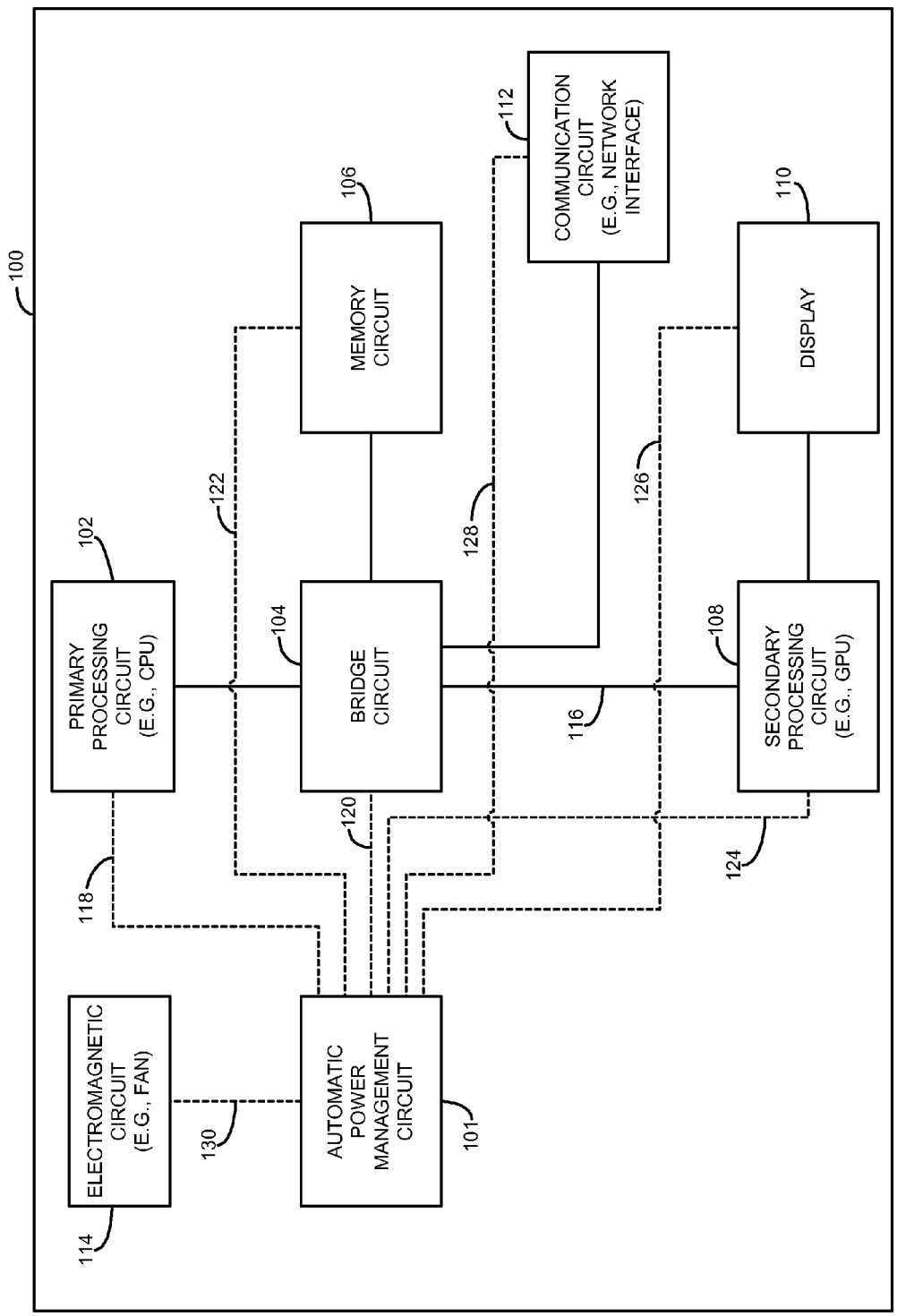
FIG. 1 is an exemplary block diagram of a device having an automatic power management circuit according to the present disclosure.

In one example, an apparatus includes a power management interpretation circuit and a power management control circuit. The power management interpretation circuit provides power management control information in response to power control parameters. The power management control circuit selectively controls power consumption of a power consuming circuit based on the power management control information. The power consuming circuit provides the power control parameters. A related method is also disclosed.

The method and apparatus provide, among other advantages, automated (e.g., "plug and play") power management of various power consuming circuits that have different operating characteristics. As such, power management of complex systems having multiple different power consuming circuits can be easily implemented without the need of a user reviewing white papers describing the operating characteristics of power consuming circuits. Other advantages will be recognized by those of ordinary skill in the art.

In one example, power consuming circuit provides the power control parameters in response operatively coupling the power consuming circuit to the power management interpretation circuit and/or querying the power consuming circuit for the power control parameters. In one example, the power consuming circuit includes a power control parameter storage circuit that stores the power control parameters. The power control parameters can comprise voltage source control information, clock source control information, power operating mode control information and/or other suitable control parameters. In addition, the power control parameters can comprise extensible markup language.

In one example, the apparatus includes a power source circuit. The power source circuit adjusts power consumption of the power consuming circuit in response to power control information. The power management control circuit controls the power consuming circuit via the power control information. For example, the power control information can instruct the power source circuit to adjust supply voltage, adjust supply current, adjust clock speed, and/or transition from a first power operating mode to a second power operating mode.

In one example, the power consuming circuit includes one or more sensor circuits. The sensor circuit(s) provide sensed information such as, for example, temperature, voltage, current, clock frequency, and/or other suitable sensed information. The power management control circuit selectively controls power consumption of the power consuming circuit based on the sensed information.

In one example, the power consuming circuit comprises a memory circuit, a processing circuit, a bridge circuit, a communication circuit, an electromagnetic circuit, and/or a display.

As used herein, the term "circuit" can include an electronic circuit, one or more processors (e.g., shared, dedicated, or group of processors such as but not limited to microprocessors, digital signal processors, or central processing units) and memory that execute one or more software or firmware programs, combinational logic circuits, an application specific integrated circuit, and/or other suitable components that provide the described functionality. Additionally, as will be appreciated by those of ordinary skill in the art, the operation, design, and organization, of a "circuit" can be described in a hardware description language such as Verilog™, VHDL, or other suitable hardware description languages.

Referring now to FIG. 1, an exemplary functional block diagram of a device 100 such as a wireless phone, a mobile and/or stationary computer, a printer, a LAN interface (wireless and/or wired), a media player, a video decoder and/or encoder, and/or any other suitable device is depicted. The device 100 includes an automatic power management circuit 101 and multiple power consuming circuits such as, for example, a primary processing circuit 102 (e.g., CPU), a bridge circuit 104 (e.g., Northbridge and/or Southbridge), a memory circuit 106, a secondary processing circuit 108 (e.g., GPU), a display 100, a communication circuit 112 (e.g., network interface), and/or an electromagnetic circuit 114 (e.g., fan).

The primary processing circuit 102 is operatively coupled to the bridge circuit 104 and processes requests from the bridge circuit 104. The memory circuit 106 stores information communicated from the bridge circuit 104. The bridge circuit 104 communicates visual information 116 (e.g., drawing commands or other suitable visual information) to the secondary processing circuit 108, which processes the information for presentation on the display 110.

The automatic power management circuit 101 is operatively coupled to the power consuming circuits, which as noted above, can comprise the primary processing circuit 102, the bridge circuit 104 (e.g., Northbridge), the memory circuit 106, the secondary processing circuit 108 (e.g., GPU), the display 110, the communication circuit 112 (e.g., network interface), and/or the electromagnetic circuit 114 (e.g., fan). Each of the power consuming circuits 102, 104, 106, 108, 110, 112 provide respective power control parameters received via respective communication links 118, 120, 122, 124, 126, 128, 130. In one embodiment, the power control parameters can include voltage source control information, clock source control information, power operating mode information, and/or other suitable power control parameters.

The voltage source control information can include suitable information that can be used to control a voltage source of a power consuming circuit. For example, the voltage source control information can include a voltage operating range, a voltage adjustment step size, an adjustment slew rate, a voltage adjustment settling time, a maximum acceptable current draw, and/or other suitable voltage (or power) source control information for the power consuming circuit.

The clock source control information can include suitable information that can be used to control a clock source of a power consuming circuit. For example, the clock source control information can include a frequency range (e.g., a high and low frequency), a frequency adjustment step size, a frequency adjustment slew rate, a frequency adjustment slew rate, a frequency adjustment settling rate, and/or other suitable clock source control information for the power consuming circuit.

The power operating mode information can include suitable information that can be used to control a synthetic source (e.g., voltage and frequency controlled together as states of operation). For example, the power operating mode information can include states of operation, method of control for each state, state transition slew rate, state transition settling time, and/or other suitable information power operating mode information for the power consuming circuit.

Additional exemplary power control parameters are identified in Table 1 below.

TABLE 1

| Element sections | Description |
| --- | --- |
| <power_system> | High-level tag for entire power system description |
| <manufacturer> | |
| <model> | |
| <product_family> | |
| <description> | |
| <contact> | |
| <power_sources> | List of power sources |
| <description> | |
| <voltage_source> | Named voltage source, may feed voltage rails or sinks |
| <description> | |
| <type> | AC/DC |
| <source> | Line, battery, power rail |
| <voltage_scaler> | Scales voltage on a power source |

TABLE 1-continued

| Element sections | Description |
| --- | --- |
| <description> | |
| <range> | ".0.1.5 v" |
| <step> | ".1 v" |
| <slew> | ".10 u" (10 microseconds) |
| <settling_time> | ".5 n" (5 nanoseconds) |
| <max_current> | "5 a" (5 amps) |
| <method> | Control method: increment/decrement, or ordinal values |
| <temperature_sensor> | "names=name value="degrees"" |
| <voltage_sensor> | "name=name value=volts" |
| <current_sensor> | "name=name value=amps" |
| <power_conditioner_sensor> | Detects spikes (overshoot/undershoot), current drops |
| <shutoff_fuse_sensor> | Detects shutoff fuse state |
| <other_sensor> | |
| <set> | (set "name" "value") (value depends on the named entity) |
| <get> | (get "name" "value") (value is returned) |
| >clock_source> | Clock source, may feed multiple sinks or clock rails |
| <description> | |
| <type> | Xtal, ATCO, CDXO, MCXO, etc. |
| <source> | Battery, line |
| <frequency_scaler> | Scales frequency |
| <description> | |
| <method> | Controlled by increment/decrement, multiply/divide, or by ordinal values |
| <range> | "low=hz high=hz" |
| <step_size> | "1 mh" (1 mhz) *if applicable-may be clock divider instead) |
| <slew_rate> | "10 n" (10 nanoseconds) |
| <settling_time> | "5 n" (5 nano seconds) |
| <clock_sensor> | "name=name value-value of current clock" |
| <set> | (set "name" "value") (value depends on the named entity) |
| <get> | (get "name" "value") (value is returned) |
| <voltage_rail> | May feed one or more sinks, fed by a voltage source |
| <source> | A named voltage source |
| <clock_rail> | May feed multiple one or more sinks, fed by a clock source |
| <source> | A named clock source |
| synthetic_source> | Voltage and frequency controlled together as states |
| <description> | |
| <synthetic_scaler> | Allows states to be changed |
| <description> | |
| <states> | on, off, fast, slow, hibernate, sleep, etc. |
| <method> | Controlled by increment/decrement or by ordinal value |
| <slew_rate> | "10 n" (10 nanoseconds) |
| <settling_time> | "5 n" (5 nano seconds) |
| <state_value> | "value=value" |
| <set> | (set "name" "value") (value depends on the named entity) |
| <get> | (get "name" "value") (value is returned) |
| <sink_list> | List of all power consumers |
| <description> | |
| <sink> | A named consumer of power (GPU, ddr5 memory, etc.) |
| <description> | |
| <voltage_source> | Voltage source or voltage rail |
| <clock_source> | Clock cource or clock rail |
| <synthetic_source> | Combined voltage & frequency source (managed power) |
| <temperature_sensor> | "name=name value=value" |
| <voltage_sensor> | "name=name value=value" |
| <current_sensor> | "name=name value=value" |
| <frequency_sensor> | "name=name value=value" |
| <power_conditioner_sensor> | Detects spikes (overshoot/undershoot), current drops |
| <shutoff_fuse_sensor> | Detects shutoff fuse state |
| <other_sensor> | |
| <set> | (set "name" "value") (value |

TABLE 1-continued

| Element sections | Description |
| --- | --- |
| | depends on the named entity) |
| <get> | (get "name" "value") (value is returned) |

The automatic power management circuit 101 selectively controls power consumption, via the respective communication links 118, 120, 122, 124, 126, 128, 130, based on the respective power control parameters. Each of the power consuming circuits 102, 104, 106, 108, 110, 112 can provide the power control parameters in any suitable manner. For example, in one embodiment, each of the power consuming circuits 102, 104, 106, 108, 110, 112 can provide the power control parameters in response to being operatively coupled to the automatic power management circuit 101. In other embodiment, the automatic power management circuit 101 can send a query via the respective communication link 118, 120, 122, 124, 126, 128, 130 and, in response thereto, the respective power consuming circuit 102, 104, 106, 108, 110, 112 can provide the power control parameters via the respective communication link 118, 120, 122, 124, 126, 128, 130.

Figure 2:
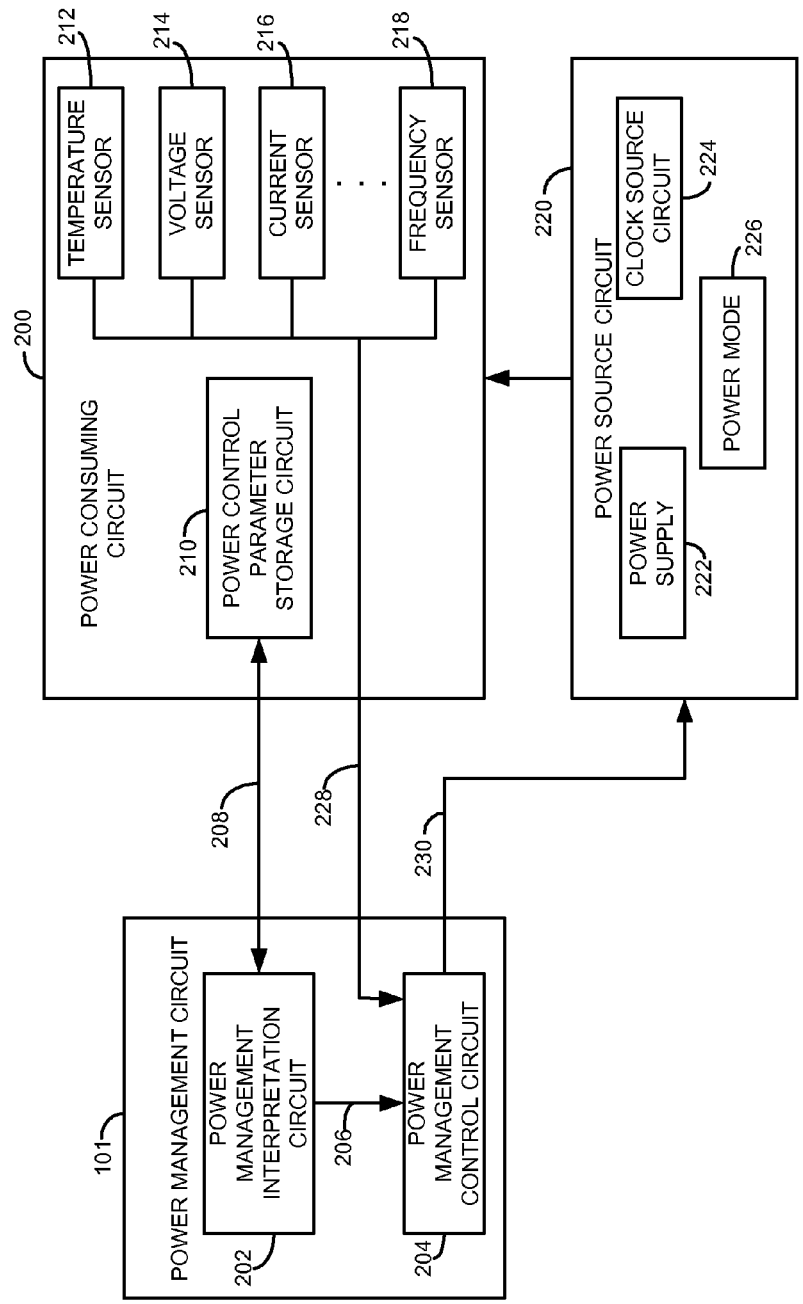
FIG. 2 is an exemplary block diagram of the automatic power management circuit and associated power consuming circuit.

Referring now to FIG. 2, an exemplary block diagram of the automatic power management circuit 101 and the multiple power consuming circuits 102, 104, 106, 108, 110, 112 (hereinafter referred to collectively as power consuming circuit 200) is depicted. As shown, in this example, the automatic power management circuit 101 includes a power management interpretation circuit 202 and a power management control circuit 204. The power management interpretation circuit 202 provides power management control information 206 in response to power control parameters 208 received from the power consuming circuit 200. As discussed in more detail below, the power management control circuit 204 selectively controls power consumption of the power consuming circuit based on the power management control information 206.

The power consuming circuit 200 includes a power control parameter storage circuit 210 and one or more suitable sensors such, for example, as a temperature sensor 212, a voltage sensor 214, a current sensor 216, a frequency sensor 218, and/or other suitable sensors. In addition, in some embodiments, the power consuming circuit 200 can include a power source circuit 220. In other embodiments, the power consuming circuit 220 can be external to the power consuming circuit 200 as depicted.

The power control parameter storage circuit 210 stores the power control parameters 208 and can communicate the power control parameters 208 to the power management circuit 101. The power control parameter storage circuit 210 can comprise any suitable storage circuit such as volatile memory, non-volatile memory, and/or other suitable storage circuit capable of storing the power control parameters 208. In one embodiment, the power control parameters 208 can comprise extensible markup language although other suitable formats can be used if desired.

The power source circuit 200 provides power (e.g., voltage and/or current) to the power consuming circuit 200. As such, the power source circuit 220 can comprise one or more suitable power source elements that can be used to source the power consuming circuit 200. For example, the power source circuit 220 can comprise a power supply circuit 222 (e.g., a voltage and/or current source), a clock source circuit 224, and/or a power mode circuit 226. The power source circuit 220 can comprise any suitable circuit capable of providing power to the power consuming circuit such as, for example, a voltage or power source circuit. The clock circuit 224 can comprise any suitable circuit capable of providing a clocking signal or frequency to the power consuming circuit 200 such as, for example, a phase lock loop circuit. The power mode circuit 226 can comprise any suitable circuit capable of transitioning the power consuming circuit 200 from one power operating mode to another power operating mode. For example, the power mode circuit 226 can adjust power (i.e., voltage and/or current) and/or frequency supplied to the power consuming circuit 200 to transition the power consuming circuit 200 to operate in one of multiple power operating modes. Exemplary power operating modes can include on, off, slow, hibernate, sleep, and/or other suitable power operating modes. In addition, in some embodiment, the modes of operation can be in conformance with a suitable power specification such as Advanced Configuration and Power Interface (ACPI), Operating System-directed configuration and Power Management (OSPM), and/or any other suitable power specification having multiple power operating modes.

During operation one or more of the sensors 212, 214, 216, 218 provide sensed information 228. The sensed information 228 indicates one or more operating characteristics of the power consuming circuit 200 such as, for example, temperature, power consumption (e.g., voltage and/or current use), operating frequency (e.g., for clocked circuits), and/or other suitable sensed information related to power consumption. The power management control circuit 204 controls the power source circuit 220 via the power control information 230, which instructs the power source circuit 220 to: adjust supply voltage, adjust supply current, adjust clock speed, transition from one power operating mode to another power operating mode, and/or adjust other suitable characteristics related to power consumption. More specifically, the power management control circuit 204 provides power control information 230 based on the power management control information 206 and the sensed information 228. In response to the power control information 230, the power source circuit 220 adjusts its operating characteristics (e.g., voltage, current, clock frequency, power mode) in accordance with the power control information 230 to adjust power consumption of the power consuming circuit 200.

Figure 3:
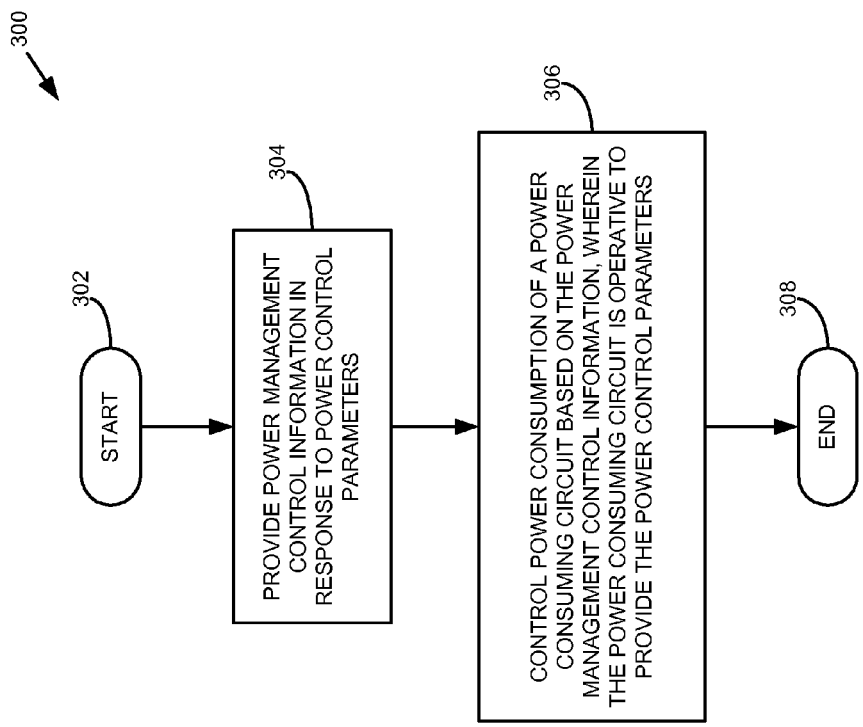
FIG. 3 is a flowchart depicting exemplary operations that can be performed by the automatic power management circuit.

Referring now to FIG. 3, exemplary operations that can be performed by the automatic power management circuit 101 are generally identified at 300. The process starts at 302. At 304, the power management interpretation circuit 202 provides the power management control information 206 in response to the power control parameters 208. At 306, the power management control circuit 204 selectively controls power consumption of the power consuming circuit 200 based on the power management control information 206, which is based on the power control parameters 208 provided from the power consuming circuit 200. The process ends at 308.

Figure 4:
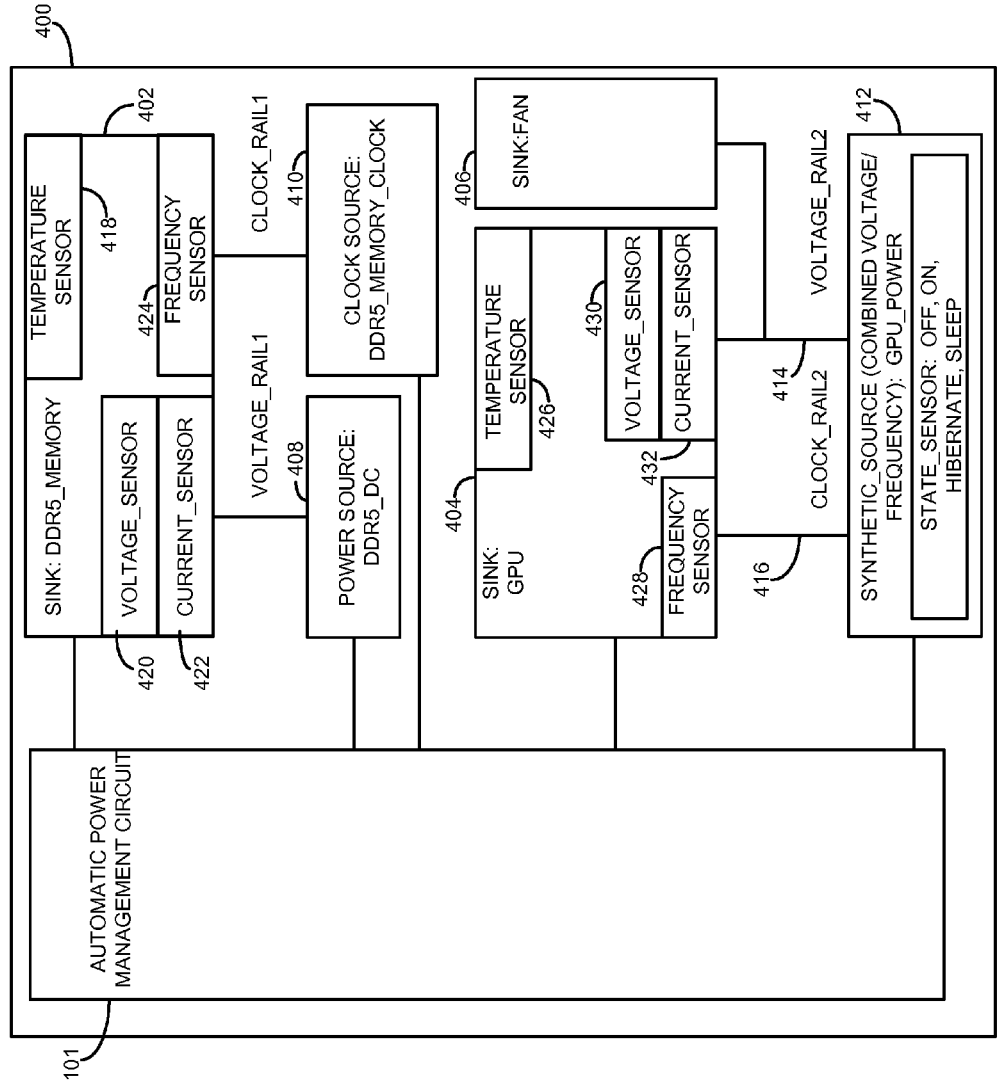
FIG. 4 is an exemplary block diagram of another device including the automatic power management circuit.

Referring now to FIG. 4, an exemplary functional block diagram of a device 400 having the automatic power management circuit 101 is depicted. The device 400 can be any suitable device such as, for example, a wireless phone, a mobile and/or stationary computer, a printer, a LAN interface (wireless and/or wired), a media player, a video decoder and/or encoder, and/or any other suitable device.

The device 400 includes three power consuming circuits, namely, a memory circuit 402 (e.g., DDR5 memory), a graphics processing circuit 404, and a fan 406 all of which are operatively coupled to the automatic power management circuit 101 as shown. The memory circuit 402 operatively coupled to a power source circuit 408 and a clock source circuit 410 as shown. The graphics processing circuit 404 and the fan 406 are operatively coupled to a synthetic power circuit 412 as shown. The synthetic power circuit 412 can provide a voltage output 414 and frequency output 416 based on a particular state of operation. Exemplary states of operation include off, on, hibernate, sleep, and/or other suitable states of operation.

In this example, the memory circuit 402 includes various sensors such as, for example, a temperature sensor 418, a voltage sensor 420, a current sensor 422, and a frequency sensor 424. Similarly, in this example, the graphics processing circuit 404 includes various sensors such as, for example, a frequency sensor 428, a voltage sensor 430, and a current sensor 432.

The automatic power management circuit 101 can obtain information such as sensor readings and power control parameters from the power consuming circuits 402, 404, 406. In one example, the automatic power management circuit 101 can use a get command to retrieve the information. In response to the obtained information, the automatic power management circuit 101 can control the power source circuits 408, 410, 412 in order to implement a power control policy. In one example, the automatic power management circuit 101 can use a set command to control the power source circuits 408, 410, 412.

The device 400 can be described using any suitable language such as extensible markup language (XML) to describe, among other things, the power control parameters. For example, the device 400 depicted in FIG. 4 can be described using extensible markup language as shown below in the example of Listing 1.

Listing 1

```
<power_system>
    <manufacturer>"AMD"</manufacturer>
    <model>"R880"</model>
    <product_family>"8xx GPU"</product_family>
    <contact>"info@amd.com One AMD Place,
    408.749.9000"</contact>
</power_system>
<power_sources>
    <description>"All power sources"</description>
    <voltage_source name="ddr5_dc">
        <description>Descriptive text</description>
        <type = "AC | DC"></type></type>
        <source = "line | battery | power_rail"></source>
        <voltage_scaler>
            <description>Descriptive text</description>
            <!-- voltage level changing -->
            <range low=".8v" high="1.3v" nominal ="1.2v"></range>
            <step_size>".1v"</step_size>
            <slew_rate>".01us"</slew_rate>
            <settling_time>"10us"</settling_time>
            <max_current>"5a"</max_current>
            <!-- random or stepped, ordered changes allowed -->
            <method type = "stepped | random"></method>
        </voltage_scaler>
        <!-- sensors -->
        <temperature_sensor name="none"></temperature_sensor>
        <voltage_sensor name="none"></voltage_sensor>
        <current_sensor name="none"></current_sensor>
        <power_sensor name="none"></power_sensor>
        <!-- commands for voltage scaling -->
        <set name="voltage" value="voltage"></set>
        <!-- commands for sensors -->
        <get name="temperature_sensor" return="cstring"></get>
        <get name="voltage_sensor" return="cstring"></get>
        <get name="current_sensor" return="cstring"></get>
        <get name="power_sensor" return="cstring"></get>
    </voltage_scaler>
    <clock_source name = "ddr5_memory_clock">
        <description>Descriptive text</description>
```

-continued

Listing 1

```
        <type = "xtal | ATXCO | CDXO | MCXO | etc."></type>
        <source = "line |clock_rail"></source>
        <clock_scaler>
            <description>Descriptive text</description>
            <!-- clock rate changing -->
            <range low="10mhz" high="500mhz"></range>
            <step_size>"100mhz"</step_size>
            <slew_rate>".01us"</slew_rate>
            <settling_time>"10us"</settling_time>
            <!-- random or stepped, ordered changes allowed -->
            <method type = "stepped | random"></method>
        </clock_scaler>
    </clock_source>
    <synthetic_source name = "GPU_power">
        <description>combined voltage/frequency</description>
        <!-- This is a state-managed power system - -->
        <synthetic_scaler>
            <!-- power management states -->
            <state names = "off | hibernate | sleep | on"></state>
            <!-- random or stepped, ordered changes allowed-->
            <method type = "stepped | random"></method>
            <slew rate>".01us"></slew_time>
            <settling time>"10us"></settling_time>
        </synthetic_scaler>
        <state_value name="GPU_power_state"></state_value>
    </synthetic_source>
<sink_list>
    <description>All the elements that consume power</description>
    <sink name="ddr5_memory">
        <description>GPU private memory</description>
        <voltage_source name="ddr5_dc"></voltage_source>
        <clock_source name="dr5_memory_clock"></clock_source>
        <!-- sensors -->
        <temperature_sensor name="none"></temperature_sensor>
        <voltage_sensor name="none"></voltage_sensor>
        <current_sensor name="none"></current_sensor>
        <frequency_sensor name="none"></frequency_sensor>
    </sink>
    <sink name="GPU">
        <description>GPU</description>
        <synthetic_source name="GPU_power"></voltage_source>
        <!-- sensors -->
        <temperature_sensor name="none"></temperature_sensor>
        <voltage_sensor name="none"></voltage_sensor>
        <current_sensor name="none"></current_sensor>
        <frequency_sensor name="none"></frequency_sensor>
    </sink>
    <sink name="fan">
        <description>"A fan with speed controls</description>
        <voltage_source="voltage_rail2"<voltage_source>
    </sink>
</sink_list>
```

As shown above in Listing 1, each component (and its respective power control parameters) of the device 400 is described in a standard manner. As such, power management of the device 400 can be easily implemented by the automatic power management circuit 101 without having to review documentation of each of the components to determine the respective operating and power management characteristics.

As noted above, among other advantages, the method and apparatus provide automated (e.g., "plug and play") power management of various power consuming circuits that have different operating characteristics. As such, power management of complex systems having multiple different power consuming circuits can be easily implemented without the need of a user reviewing white papers (or other product information) by describing the operating characteristics of power consuming circuits, which can be implemented as an industry standard manner published as a specification. Other advantages will be recognized by those of ordinary skill in the art.

While this disclosure includes particular examples, it is to be understood that the disclosure is not so limited. Numerous modifications, changes, variations, substitutions, and equivalents will occur to those skilled in the art without departing from the spirit and scope of the present disclosure upon a study of the drawings, the specification, and the following claims.

What is claimed is:

1. An apparatus comprising:
a power management interpretation circuit that is operative to provide power management control information in response to power control parameters from a plurality of varying types of power consuming circuits; and
a power management control circuit that is operative to selectively control power consumption of a power consuming circuit based on the power management control information and based on sensed information associated with the plurality of varying types of power consuming circuits, wherein each of the plurality of power consuming circuits is operative to provide respective power control parameters for the power management interpretation circuit.

2. The apparatus of claim 1 wherein each of the plurality of power consuming circuits is operative to provide its respective power control parameters in response to at least one of: operatively coupling the power consuming circuit to the power management interpretation circuit and querying the power consuming circuit for the power control parameters.

3. The apparatus of claim 1 wherein the power control parameters comprise extensible markup language.

4. The apparatus of claim 1 wherein the power consuming circuit comprises a power control parameter storage circuit that is operative to store the power control parameters.

5. The apparatus of claim 1 comprising a power source circuit that is operative to adjust power consumption of the power consuming circuit in response to power control information, wherein the power management control circuit is operative to control the power consuming circuit via the power control information.

6. The apparatus of claim 5 wherein the power control information instructs the power source circuit to at least one of: adjust supply voltage, adjust supply current, adjust clock speed, and transition from a first power operating mode to a second power operating mode.

7. The apparatus of claim 1 wherein the power consuming circuit comprises at least one sensor circuit that is operative to provide the sensed information.

8. The apparatus of claim 1 wherein the power consuming circuit comprises at least one of: a memory circuit, a processing circuit, a bridge circuit, a communication circuit, an electromagnetic circuit, and a display.

9. The apparatus of claim 1 wherein the power control parameters comprise at least one of: voltage source control information, clock source control information, and power operating mode control information.

10. A method, carried out by an apparatus for controlling power consumption, comprising:
providing power management control information in response to power control parameters from a plurality of varying types of power consuming circuits; and
controlling power consumption of a power consuming circuit based on the power management control information, and based on sensed information associated with the plurality of varying types of power consuming circuits, wherein each of the plurality of power consuming circuits is operative to provide respective power control parameters for providing the power management control information.

11. The method of claim 10 comprising providing the power control parameters in response to at least one of: operatively coupling the power consuming circuit to a power management circuit and querying the power consuming circuit for the power control parameters.

12. The method of claim 10 wherein the power control parameters comprise extensible markup language.

13. The method of claim 10 wherein the power consuming circuit is operative to store the power control parameters.

14. The method of claim 10 wherein the power control parameters comprise at least one of: voltage source control information, clock source control information, and power operating mode control information.

15. A non-transitory computer readable medium comprising information that when executed by at least one processor causes the at least one processor to:
provide power management control information for a power consuming circuit in response to power control parameters from a plurality of varying types of power consuming circuits; and
control power consumption of a power consuming circuit based on the power management control information and based on sensed information associated with the plurality of varying types of power consuming circuits, wherein each of the plurality of power consuming circuits is operative to provide power control parameters for providing the power management control information.

16. The computer readable medium of claim 15 wherein the power control parameters are provided in response to at least one of: operatively coupling the power consuming circuit to a power management circuit and querying the power consuming circuit for the power control parameters.

17. The computer readable medium of claim 15 wherein the power control parameters comprise at least one of: voltage source control information, clock source control information, and power operating mode control information.

18. An apparatus comprising:
a plurality of power consuming circuits each operative to provide respective power control parameters and respective sensed information associated with the respective power consuming circuit; and
a power management circuit that is operative to selectively control power consumption of each of the plurality of power consuming circuits based on the respective power control parameters provided by each of the plurality of power consuming circuits and based on the respective sensed information provided by each of the plurality of power consuming circuits.

19. The apparatus of claim 18 wherein each of the power consuming circuits is operative to provide the respective power control parameters in response to at least one of: operatively coupling the power consuming circuit to the power management circuit and querying the power consuming circuit for the power control parameters.

20. The apparatus of claim 18 wherein the each of the power consuming circuits comprises a power control parameter storage circuit that is operative to store the respective power control parameters.

21. The apparatus of claim 18 wherein each of the power consuming circuits comprises at least one sensor circuit that is operative to provide the respective sensed information.

22. The apparatus of claim 18 wherein the power control parameters comprise at least one of: voltage source control information, clock source control information, and power operating mode control information.

23. A method, carried out by an apparatus for controlling power consumption, comprising:

providing power management control information in response to power control parameters from a plurality of varying types of power consuming circuits, wherein the power control parameters comprise extensible markup language; and controlling power consumption of a power consuming circuit based on the power management control information, wherein each of the plurality of power consuming circuits is operative to provide respective power control parameters for providing the power management control information.

\* \* \* \* \*